Patented Mar. 25, 1952

2,590,077

UNITED STATES PATENT OFFICE 2,590,077

ICE CREAM COMPOSITION

Jan Lolkema, Hoogezand, Netherlands, assignor to Naamlooze Vennootschap: W. A. Scholten's Chemische Fabrieken, Groningen, Netherlands, a corporation of the Netherlands No Drawing. Application June 2, 1949, Serial No. 96,834. In the Netherlands February 12, 1949

3 Claims. (Cl. 99—136)

It is known that in the preparation of ice cream and other ices various thickening agents, such as e. g. starch, gum, gum tragacanth, carob gum, gelatine and the like, are used as stabilizers.

It has appeared, however, that if starch and starch products, such as oxidized starch, soluble starch, pregelatinized starch, cold swelling starch and the like are used as stabilizers, the ices thus obtained are not satisfactory since they will have a more or less granular structure, and consequently will not have the fine taste and appearance desired. Moreover the keeping qualities will not be very good, since the structure of the ice is apt to deteriorate, when it is kept in a refrigerator. This is the reason why only gelatine and natural gums have been hitherto used for the purpose referred to.

It has now been found that excellent results may be obtained by using as stabilizers, ethers, esters or mixed ether-esters, soluble in cold and/or hot water, of polysaccharides that will gelatinize or dissolve in hot water and are adapted to form a solution, a paste, or a suspension when stirred with a small proportion of water, the said ethers, esters or ether-esters being prepared according to the method described in Dutch patent specification No. 55,779, by suddenly heating for a short time and to a high temperature— which for gelatinizable poly-saccharides preferably lies above the gelatinizing point—a mixture of the polysaccharide in question with a limited quantity of water, the etherifying or esterifying agent, and, if required, an alkaline substance, contingently after the etherifying and/or esterifying process has been partly or entirely accomplished, during which treatment the said mixture is pressed to thin layers and dried simultaneously.

This process is preferably carried out by passing the said mixture containing ½–2 parts by weight of water on 1 part by weight of the polysaccharide over a rotating drum heated to a temperature of about 100–180° C., on which the mixture is dried in a period varying from a few seconds to a few minutes.

The ethers and esters obtained according to the said patent consist of small, thin flakes which will readily dissolve in water to a homogeneous solution.

If the said flakes are used as stabilizers for ices it appears that such ices will have a considerably better texture, a better taste on the tongue and a better appearance than ices prepared with other binding agents, e. g. starch or modified starches. A further important advantage resides in the fact that the said ices have excellent keeping qualities and that ice which is left and is kept in frozen condition in order to be used the following day will maintain an excellent texture, owing to the fact that practically no crystallization will occur, if the above mentioned products obtained by the method according to Dutch Patent 55,779 are used as stabilizers. As compared with such stabilizers as gelatine, starch and the like, the starch ethers and esters obtained according to the said patent also have the advantage of being practically not attacked by micro-organisms, so that the ices prepared with the said ethers and esters will be much less liable to deterioration.

The proportion of ether or ester to be added may vary; in actual practice generally about 10 grams per litre are used.

The process according to the invention may be used both for ice creams and for ices which do not contain cream or another fatty material.

The addition of the stabilizer may be effected in different manners. One may, for example, first dissolve the ether or the ester separately in a portion of the liquid and add the said solution to the liquid mixture to be frozen. One may also add the dry ethers or esters in a pulverized condition, preferably mixed with the required amount of sugar to the liquid. In this case too homogeneous distribution is obtained, without any formation of lumps.

Instead of adding the ethers and esters during the preparation of the ice, ice powders may be produced in which the said ethers or esters have been incorporated, and the invention also covers the preparation of the said ice powders.

The invention is particularly important with regard to the use of starch ethers and esters. Very favorable results are obtained with the starch ether carboxylic acids, particularly with the starch ethers of glycolic acid, which may be produced in a very simple manner by etherifying starch with monohalogen carboxylic acids, e. g. monochloroacetic acid by the process of Dutch Patent No. 55,779.

The invention will be illustrated by following examples:

Example 1

900 parts by weight of cane sugar are intimately mixed with some vanilla powder and 60 parts by weight of the sodium salt of a starch ether carboxylic acid, obtained by etherifying 1000 parts by weight of starch with 150 parts by weight of technical monochloroacetic acid according to Dutch Patent No. 55,779. This mixture is added while stirring vigorously to 6000 parts by volume of milk, preheated to 80° C., after which the mixture is kept at this temperature for 30 minutes. The composition thus prepared is cooled down to room temperature and then frozen in a freezing apparatus. The ice thus obtained has a smooth and firm texture and a very agreeable taste closely resembling those of ice made from cream.

If a vanilla ice is produced in the manner described above, with pregelatinized starch, obtained by converting in the usual manner e. g. a mixture of 1 part by weight of starch with 1 part by volume of water into pregelatinized starch on heated cylinders, it will not only be necessary to use a larger proportion of binding agent, e. g. 90 instead of 60 parts by weight, but the ice, moreover will have a more or less granular structure. If such an ice kept in storage for some time, more or less coarse ice crystals will be formed which impart an unfavorable texture and taste to the product, and render the same too hard.

In comparison with the composition containing the starch ether, the mixture prepared with the aid of pregelatinized starch will absorb less air when beaten, so that the first mentioned composition, besides the advantages mentioned above, moreover, will produce a higher overrun.

If the ices according to the above mentioned example are made with starch glycolate not prepared according to the method of Dutch Patent 55,779, but obtained by drying the starch glycolate e. g. in vacuo or by precipitating the same with alcohol followed by filtering, washing and drying, in the manner hitherto used, it will be found that the structure of the ices thus obtained is greatly inferior.

*Example 2*

50 parts by weight of the finely ground sodium salt of the starch ether carboxylic acid described in Example 1, 600 parts by weight of whole milk powder and 750 parts by weight of powdered sugar are intimately mixed.

When dissolving one part by weight of the ice-powder thus prepared—to which flavors and aromatic substances such as vanilla, mocha, cocoa, fruit essences and the like have been added according to taste—in 3 parts by volume of water, one will obtain a solution of which there may be made ices that will satisfy the highest requirements.

We claim:

1. Ice cream composition containing as a stabilizer a cold water soluble material selected from the group consisting of starch ethers and starch esters, said water soluble starch material consisting of particles of a comminuted thin film in the form of small scales.

2. Ice cream composition containing as a stabilizer a starch ether carboxylic acid, said ether consisting of particles of a comminuted thin film in the form of small scales.

3. Ice cream composition containing as a stabilizer a starch ester carboxylic acid, said ester consisting of particles of a comminuted thin film in the form of small scales.

JAN LOLKEMA.

REFERENCES CITED

The following references are of record in the file of this patent:

UNITED STATES PATENTS

| Number | Name | Date |
| --- | --- | --- |
| 2,395,060 | Musher | Feb. 19, 1946 |
| 2,398,950 | Moore | Apr. 23, 1946 |
| 2,459,108 | Lolkema | Jan. 11, 1949 |

FOREIGN PATENTS

| Number | Country | Date |
| --- | --- | --- |
| 114,483 | Australia | Dec. 30, 1941 |